May 15, 1934. H. R. UFFELMAN 1,959,118
ADJUSTABLE HELPER SPRING BRACKET
Filed Sept. 25, 1931
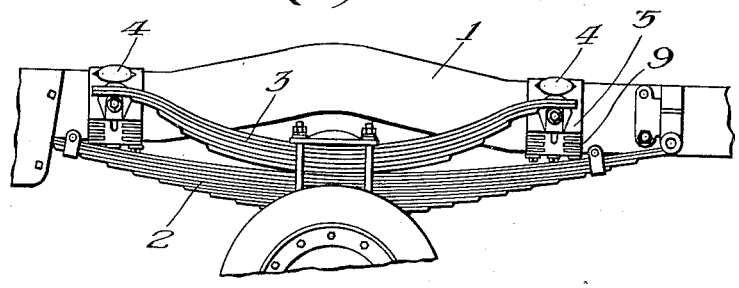
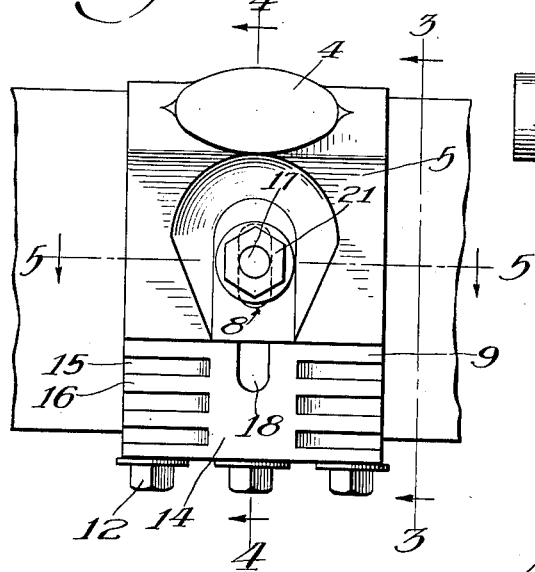
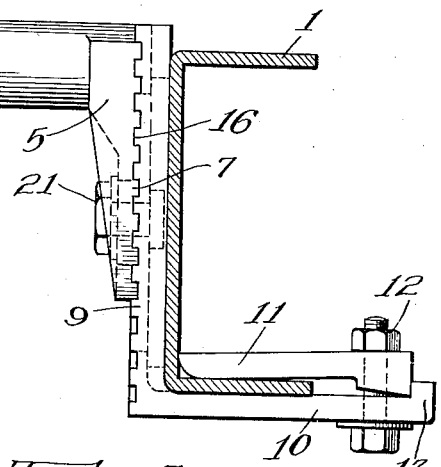
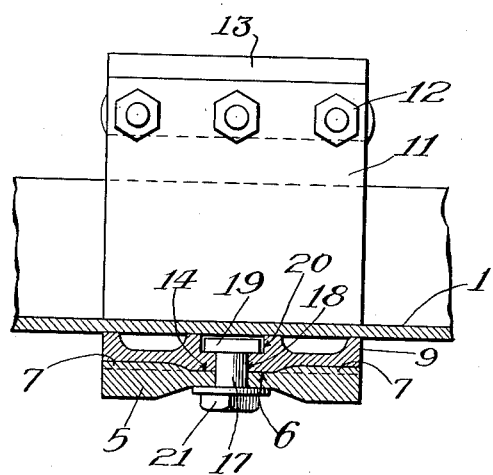
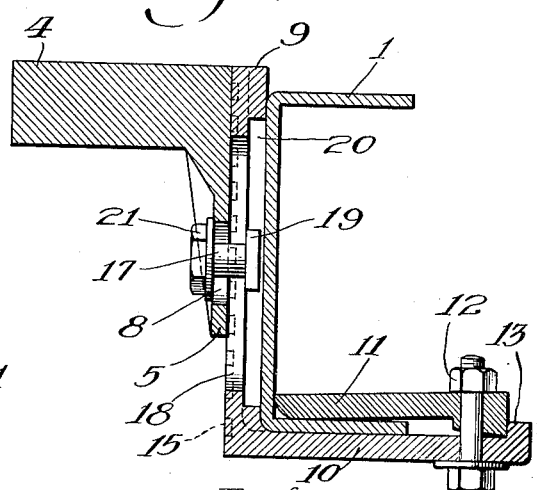
Inventor:
H. R. Uffelman,
Wm. F. Freudenreich,
By Atty.

Patented May 15, 1934

1,959,118

UNITED STATES PATENT OFFICE 1,959,118

ADJUSTABLE HELPER SPRING BRACKET

Henry R. Uffelman, Du Bois, Pa.

Application September 25, 1931, Serial No. 565,006

4 Claims. (Cl. 267—45)

It is common practice to provide trucks with auxiliary springs which normally do not function but which come into play only when the trucks are overloaded. Usually these auxiliary or helper springs are applied, not as a part of the truck construction in the process of manufacturing the truck, but as attachments to completed trucks. It is a simple matter to anchor the auxiliary springs to the axles but, in order that a part of the load may be borne by these springs, suitable brackets must be applied to the truck frames in positions to engage with the ends of the springs under predetermined load. Heretofore these brackets have been secured in place by bolts passing through the truck frames; thus necessitating the boring of holes and requiring absolute accuracy in initial adjustment unless the work is to be done over again and more holes be drilled or bored.

The object of the present invention is to produce a simple and novel construction that will permit the brackets for cooperation with auxiliary or helper springs to be easily applied without drilling, cutting and otherwise marring or weakening the truck frames, and to be positioned anywhere along the truck frames and with their spring engaging elements at any desired elevation.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of a fragment of a truck, showing an auxiliary or helper spring and cooperating brackets embodying the present invention; Fig. 2 is an elevation, similar to Fig. 1, on a larger scale, and showing only one of the brackets and a fragment of the frame; Fig. 3 is a section on line 3—3 of Fig. 2; Fig. 4 is a section on line 4—4 of Fig. 2; and Fig. 5 is a section on line 5—5 of Fig. 2.

Referring to the drawing, 1 represents one of the side members of a truck frame, 2 one of the main springs, and 3 a helper spring overlying the main spring and anchored thereto at the middle. All of these parts may be of any usual or suitable construction, the present invention having to do with the imposition of a part of the load carried by the truck frame upon the helper spring. As in prior constructions, the load to be carried by the helper spring is transmitted thereto through suitable projections 4, 4, fixed to the truck frame above the ends of the helper spring. When the load is such that no assistance is required from the helper springs, the projections on the frame stand clear of the helper springs and therefore the load is borne entirely by the main springs. Each of these projections forms part of an adjustable bracket device adapted to be clamped to the truck frame. In the arrangement shown each projection 4 comprises a short thick bar projecting from one end of a plate 5 and standing at right angles to the plane of the plate. The parts 4 and 5 are preferably integral with each other and preferably comprise a single casting. The plate 5 has on the rear side a central vertical panel 6 that is flat, while on each side of this central panel is a panel composed of transverse teeth 7 that project rearwardly or outwardly beyond the plane of the face 6. In the lower portion of the member 5 is a central vertically elongated slot 8.

Cooperating with the plate 5 is an L-shaped member whose wings are about as wide as the width of the plate 5. One of the wings, 9, of this L-shaped member, is adapted to be set against the outer face of the frame member 1, while the other wing 10 is adapted to underlie and engage with the bottom flange of this frame member. The wing 10 is made long enough so that its length will be slightly greater than the widest beam or frame member to which the device is to be applied. The L-shaped member is secured to the frame member or beam by a clamping plate 11 that overlies the lower flange of the latter; this flange being clamped between the members 10 and 11, by a bolt or a plurality of bolts 12. The wing 10 preferably has along its free end, on the upper side, a ledge 13 against which the clamping plate abuts. The bolts pass through the clamping plate in the wing 10 near this ledge.

On the front or outer face of the wing 9 of the bracket is a central flat vertical panel 14 adapted to engage with the panel 6 on the member 5 when the parts are assembled. At each side of the panel 14 are transverse grooves 15 spaced apart from each other to produce between them transverse teeth or ribs 16. The parts are so proportioned that when the plate 5 is set against the wing 9 the teeth or ribs 7 enter the grooves 15 and thus lock the members 5 and 9 together against relative vertical movements. The members 5 and 9 are held together by means of a short bolt 17. This bolt extends through a long central vertical slot 18 in the wing 9 of the bracket; the head of the bolt lying in a recess or depression 20 in the rear side of the wing and extending throughout the length of the slot 18; the depth of the recess or depression being slightly greater than the thickness of the head of the bolt, so that the bolt head will not bind but may move freely up and down. The bolt 17 passes through the slot 8 in the plate 5 and, on the outer end thereof, is a nut 21.

It will thus be seen that the part or projection 4 may be adjusted up and down through a distance equal to the length of the slot 18 and through a further distance depending upon the length of the slot 8. Furthermore, by turning the plate 5 upside down relatively to the position illustrated, the projection may be caused to lie below the truck frame. In order to permit the device to function properly when the plate 5 is turned upside down, I have shown the projection 4 as being oval in cross section. Therefore the projection will have a rocking engagement with the helper spring, when in contact therewith, regardless of whether the plate 5 is upright or upside down.

My improved construction therefore permits helper spring brackets to be quickly applied to any truck frame, with their spring engaging lugs or projections properly located with respect to the springs in each individual installation, without requiring any cutting, drilling or working of any kind of the attachments or of the truck structure.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with a vehicle flanged frame member, of an L-shaped device having a vertical wing engaged with a side of said member and the other wing underlying and engaged with the bottom flange of said member, a clamp cooperating with the latter wing and said bottom flange to secure that wing to said flange and hold the other wing against the side of said member, said vertical wing having a slot extending lengthwise thereof and also having a vertical row of transverse grooves beside said slot, a plate lying against said vertical wing and having teeth or ribs engaged in said grooves, a bolt passing through said slot and through said plate, and a spring-engaging projection on said plate.

2. The combination with a vehicle flanged frame member, of an L-shaped device having a vertical wing engaged with a side of said member and the other wing underlying and engaged with the bottom flange of said member, a clamp cooperating with the latter wing and the said bottom flange to secure that wing to said flange, said vertical wing having a slot extending lengthwise thereof and also having a vertical row of transverse grooves beside said slot, a plate lying against said vertical wing and having teeth or ribs engaged in said grooves, a bolt passing through said slot and through said plate, and a spring-engaging projection at one end of said plate, said plate being reversible to permit said end to be placed either at the bottom or at the top.

3. A device of the character described comprising an upright member adapted to be clamped against the side of an automobile frame, said member having a long vertical slot therein and a vertical row of depressions beside said slot, a plate resting against said member and having elements fitting into said depressions, a bolt extending from said plate through said slot, and a spring-engaging projection on the plate, said projection being located at one end of said plate and being oval in cross section, and said plate being reversible so as to locate the end with the projection either at the top or at the bottom.

4. A device of the character described comprising an L-shaped member, a clamp cooperating with the horizontal arm of said member to secure said member to the lower flange of a flanged vehicle frame and hold the vertical arm of the said member against the side of the frame, a part having a projecting spring-engaging member, and means to secure said part to the vertical arm of said member in any one of a plurality of positions along said arm.

HENRY R. UFFELMAN.